Figure 1:
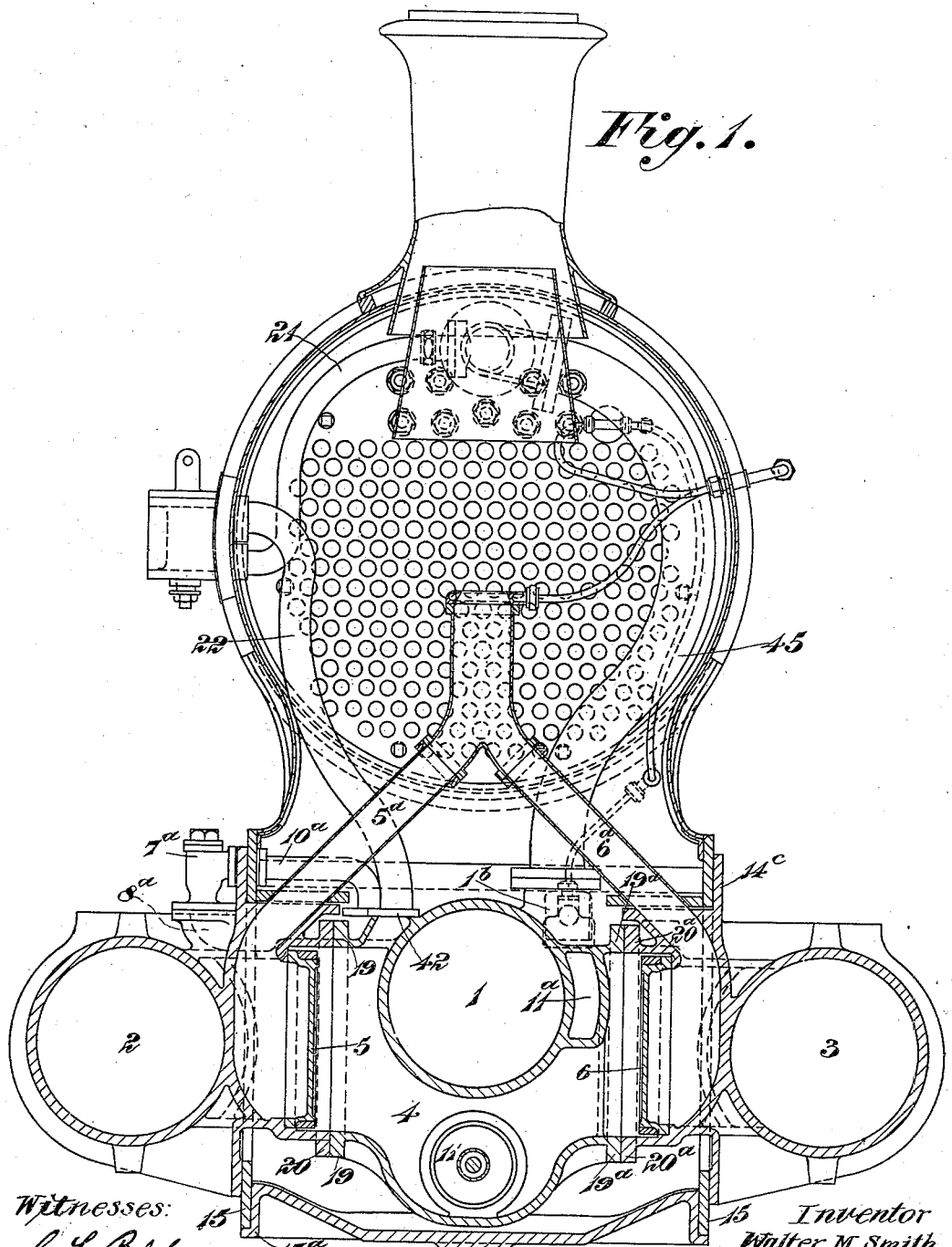

No. 662,578. Patented Nov. 27, 1900.
W. M. SMITH.
COMPOUND LOCOMOTIVE ENGINE.
(Application filed Jan. 6, 1899.)
(No Model.) 5 Sheets—Sheet 1.

Witnesses: Inventor
Walter M. Smith
By
H. C. Townsend
Attorney

No. 662,578. Patented Nov. 27, 1900.
W. M. SMITH.
COMPOUND LOCOMOTIVE ENGINE.
(Application filed Jan. 6, 1899.)
(No Model.) 5 Sheets—Sheet 2.

Witnesses:
C. L. Belcher
H. N. Capel.

Inventor
Walter M. Smith
By
H. C. Townsend
Attorney

No. 662,578. Patented Nov. 27, 1900.
W. M. SMITH.
COMPOUND LOCOMOTIVE ENGINE.
(Application filed Jan. 6, 1899.)

(No Model.) 5 Sheets—Sheet 3.

Witnesses:
C. L. Belden
Wm H. Capel

Inventor
Walter M. Smith
By
H. C. Townsend
Attorney

THE NORRIS PETERS CO., PHOTO-LITHO., WASHINGTON, D. C.

No. 662,578. Patented Nov. 27, 1900.
W. M. SMITH.
COMPOUND LOCOMOTIVE ENGINE.
(Application filed Jan. 6, 1899.)
(No Model.) 5 Sheets—Sheet 4.
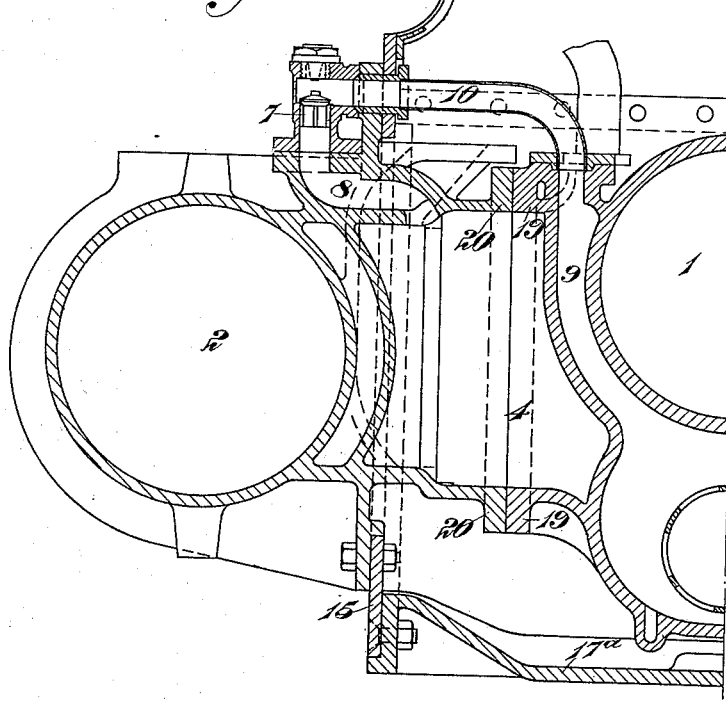
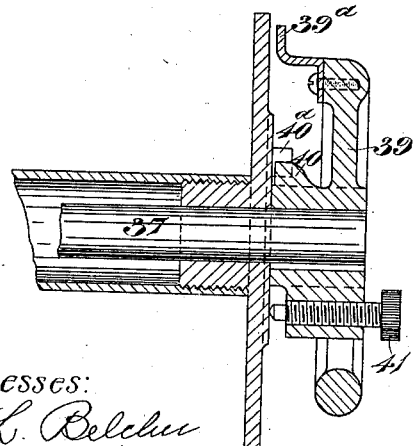
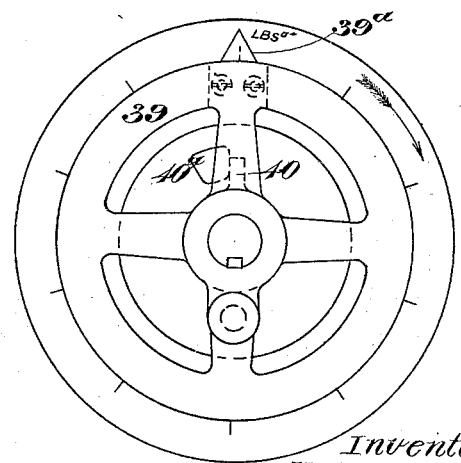
Witnesses:
C. L. Belcher
Wm H. Capel
Inventor
Walter M. Smith
By H. C. Townsend
Attorney
THE NORRIS PETERS CO., PHOTO-LITHO., WASHINGTON, D. C.

No. 662,578. Patented Nov. 27, 1900.
W. M. SMITH.
COMPOUND LOCOMOTIVE ENGINE.
(Application filed Jan. 6, 1899.)

(No Model.) 5 Sheets—Sheet 5.

Witnesses:
C. L. Belcher
Wm. H. Capel

Inventor
Walter M. Smith
By
H. C. Townsend
Attorney

UNITED STATES PATENT OFFICE.

WALTER MACKERSIE SMITH, OF NEWCASTLE-UPON-TYNE, ENGLAND.

COMPOUND LOCOMOTIVE-ENGINE.

SPECIFICATION forming part of Letters Patent No. 662,578, dated November 27, 1900.

Application filed January 6, 1899. Serial No. 701,318. (No model.)

*To all whom it may concern:*

Be it known that I, WALTER MACKERSIE SMITH, a subject of the Queen of Great Britain and Ireland, residing at Newcastle-upon-Tyne, in the county of Northumberland, England, have invented Improvements in Compound Locomotive-Engines, (for which an application for patent was filed in Great Britain July 4, 1898, No. 14,721,) of which the following is a specification.

This invention has reference to improvements in compound locomotive-engines of the kind referred to in the specification of my former Letters Patent of the United States No. 484,833, dated December 8, 1891, wherein I have described, *inter alia,* improvements whereby such engines are enabled to start easily and safely and which comprise means for maintaining in the receiver between the high and low pressure cylinders a suitable pressure of steam which can be increased at will when it is desired to increase the power of the engine.

Now my present invention has reference to improved arrangements of cylinders, an improved arrangement of non-return valves, an improved construction and arrangement of automatic steam-regulator with auxiliary valve for admitting extra steam to the receiver, the combination of such an automatic steam-regulator with non-return valves or their equivalent, and an improved construction and arrangement of a compound locomotive-engine embodying the above-indicated features.

In order that the nature of my improvements and the manner of carrying them into practical effect may be clearly understood, I will now more particularly describe the same with the aid of the accompanying illustrative drawings, whereof—

Figure 2:
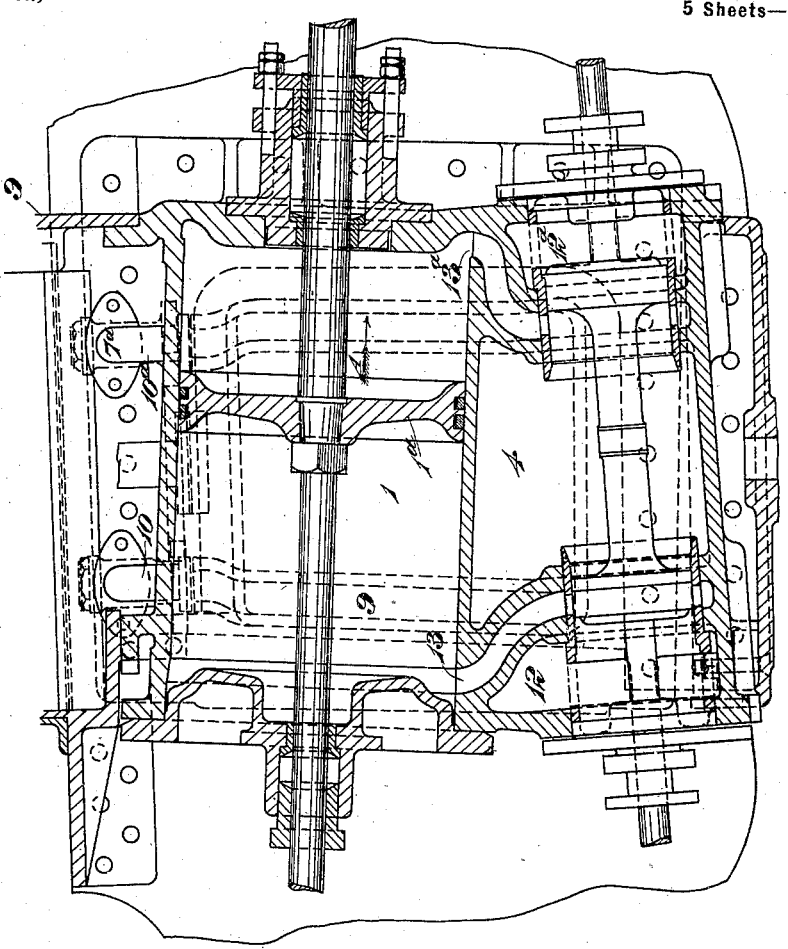
Figure 10:
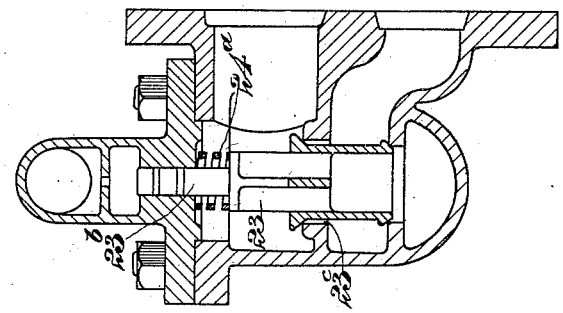
Figure 3:
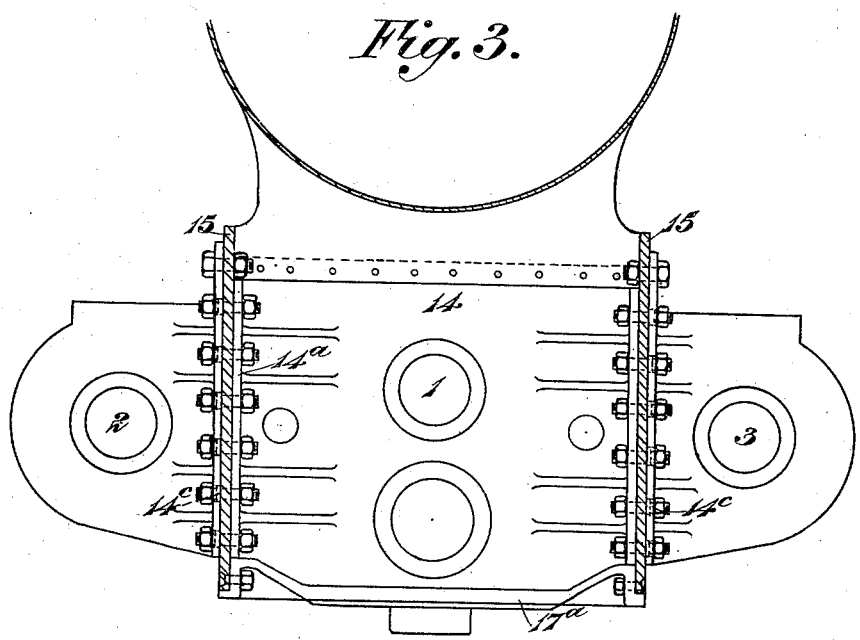
Figure 4:
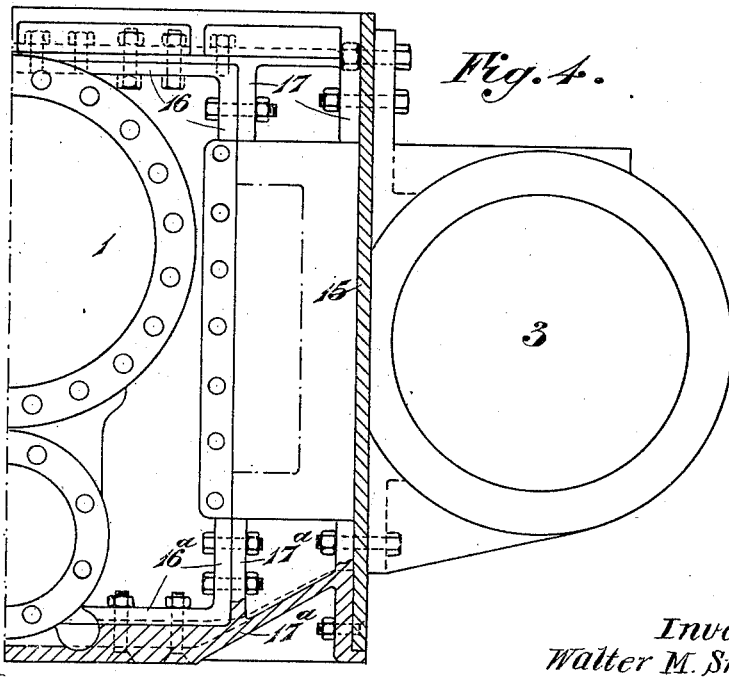

Figure 1 shows a transverse section through the smoke-box of a compound locomotive-engine embodying my invention, the engine having three cylinders—viz., an inside or central high-pressure cylinder and two outside low-pressure cylinders. Fig. 2 shows a vertical longitudinal section through the high-pressure cylinder and valve-chest with one of the ports closed by the valve and the other in communication with the receiver. Fig. 3 is a part end view, partly in section, showing the method of supporting the back ends of the cylinders on the engine-frame. Fig. 4 is a half front view of the cylinders with their supporting-framing, which is shown in cross-section. Fig. 5 shows a half transverse section through the cylinders. Of these figures the first is drawn to a smaller scale than the others. Figs. 6 to 9, inclusive, show an improved form of automatic regulator suitable for use in a compound locomotive-engine according to this invention, Fig. 6 being a side view partly in section, Fig. 7 a section on the line $x\ x$ of Fig. 6, Fig. 8 a section on the line $y\ y$ of Fig 6, and Fig. 9 a section on the line $z\ z$ of Fig. 7. Fig. 10 shows a modification of the automatic regulator. Figs. 11 and 12 show a device for controlling the automatic regulator in section and side view, respectively.

1 is the high-pressure cylinder, 2 and 3 are the low-pressure cylinders, and 4 is the receiver, which is made up of the exhaust-chamber of the high-pressure cylinder and the steam-chests of the low-pressure cylinders.

5 and 6 are slide-valves for the low-pressure cylinders 2 and 3, respectively. In some cases the valves 5 and 6 may be of the piston-valve type. $5^a$ and $6^a$ are exhaust-pipes leading therefrom.

Between the receiver 4 and the two ends of the high-pressure cylinder there are communications closed during the working of the engine (after starting) by non-return valves 7 and $7^a$ and comprising passages 8 and $8^a$, formed in the casting of the right-hand cylinder, passages 9 and $9^a$, formed in the casting of the high-pressure cylinder, and connecting-pipes 10 and $10^a$.

The high-pressure cylinder is by preference cast or made to receive a steam-distributing valve 11 of the piston type and has one steam-chest 12 at the front end and another, $12^a$, at at the back end, these steam-chests being connected together by a passage $11^a$, Fig. 1. The ports 13 and $13^a$ open directly into the passages 9 and $9^a$, respectively.

On the back end of the high-pressure cylinder 1 there is cast a deep plate or flange 14, Fig. 3, which fits between the frames 15 and is provided with flanges $14^a$ and $14^b$, whereby it is attached to the frames 15 by means of bolts $14^c$, each made of two diameters and whose parts of larger diameter pass through flanges of the outside or low-pressure cylinders, so that the central cylinder is secured to the frames 15 independently of the outside cylinders. At the front end the central cylinder 1 is provided with flanges 16 and 16ª, Fig. 4, which correspond to flanges cast or otherwise formed on suitable girders or stays 17 and 17ª, placed above and below the cylinder and fixed to the frames 15, so as to hold the central cylinder firmly in position at the front end. A flange may also be cast on the bottom of the flange 14, so that the cylinder at the back end may be bolted to the girder 17ª. It will be seen that by the above arrangements the central cylinder is held in position between the frames independently of the outside cylinders, which are themselves each bolted to the frames independently of the central cylinder. Flanges 19 and 19ª, Figs. 1 and 5, are cast on the sides of the central cylinder and correspond to flanges 20 and 20ª, cast with the outside cylinders. The parts 19 and 20 and 19ª and 20ª are respectively bolted together to form a steam-tight joint; but as the cylinders are each fixed to the frames independently of each other the strain due to the working of the engine is not borne by the flanges 19 19ª and 20 20ª. In some cases the three cylinders may be cast in one, and instead of a plate-frame a bar-frame might be used, the cylinder-casting being provided with flanges adapted to be bolted thereto, suitable brackets or clamps serving to support the said casting in place upon the framing.

When the engine is at work and running with the regulator closed, a vacuum is formed in the steam-chests of the high-pressure cylinder. To destroy this vacuum, a steam-and-air valve 1ᵇ, Fig. 1, is provided for automatically admitting steam and air at atmospheric pressure to the steam-chests. The admission of air mixed with steam is preferred to the use of air alone; but the admission of air alone would suffice to destroy the vacuum.

Although I have hereinbefore described an arrangement of three cylinders, the hereinafter-described arrangement of non-return valves and the means employed for the admission of steam to the receiver communicating with the low-pressure cylinders, so that the piston or pistons of the latter can be acted upon before an exhaust takes place from the high-pressure cylinder, and the method hereinafter described for working semicompound can be applied to a locomotive-engine constructed with four cylinders.

The improved arrangement of non-return valves will be understood from Figs. 1, 2, and 5. One of the outside cylinders (i. e., the cylinder 2 in Fig. 1) is provided with passages 8 8ª, (one of which, 8, is shown best in Fig. 5,) which respectively lead from the steam chest or receiver to the non-return valves 7 and 7ª, and thereby connect the ends of the high-pressure cylinder through the steam-ports 9 and 9ª. By my improved arrangement, as above described, the non-return valves and passages are rendered easy of access for examination or repairs. In lieu of automatic non-return valves, which I prefer, two cocks may be provided which will on starting the engine be momentarily opened simultaneously by the driver by means of suitable rods and levers to place the piston of the high-pressure cylinder in equilibrium.

For the purpose of admitting extra steam to the receiver at a predetermined pressure I employ an improved construction of automatic steam-regulator of the kind described in my said specification of former Letters Patent. This improved regulator (shown in Figs. 6 to 9) communicates with the boiler through the pipe 21 and with the receiver through the pipe 22. (See Fig. 1.) The valve 23 is formed with or carried by a spindle 24, which is formed or provided at the top with a cut-off valve or piston 25 with grooves and rings and at the bottom with a valve 26, adapted to bear on a suitable seat, so as to prevent any escape of steam from the boiler into the outer air when it is closed, the valve 23 being kept shut by the steam in the chamber 22ª pressing on the valve 23 and the pressure of the steam on the top of the piston 25. In grooves around the piston 27 at the bottom of the spindle 24 packing-rings are arranged to prevent escape of steam even when the valve 26 is raised from its seat.

28 is a chamber adapted to contain and which is filled with liquid, which may be water or oil that is loaded or is of itself heavier than water.

28ª is a small hole of such a size that a retarding or cushioning effect is produced when the spindle 24 is raised.

29 is an auxiliary or controlling valve that is normally pressed to its seat by a spring 30, that can be adjusted so as to exert more or less pressure upon the valve. A passage 31 leads from the steam-chamber 21ª to the valve 29, which admits steam at the required pressure to the chamber 32, such pressure acting through the liquid in the chamber 28 upon the piston 25 at the top of the valve-stem 24. When steam is admitted from the boiler to the chamber 21ª, it acts on the under side of the admission-valve 23; but as the water or oil in the chamber 28 must be displaced before the spindle 24 can rise before this can take place steam acts on the piston 25 at the top of the spindle 24 and the valve 23 and the blow that would otherwise be given is prevented. This cushioning may be assisted by means of flexible washers 33 at the bottom of the spindle 24 or it may be by a suitable spring. The lift of the spindle can be regulated by the washer 34, held in position by the nut 35. The chamber 32 is connected to the chamber 22ª by a passage 36, fitted with a plug through which a small hole 36ª is provided, the object of this hole being to allow a small escape of steam from the chamber 32 to the chamber 22ª, so that when the pressure in the chamber 22ª is less than the predetermined pressure the spring-pressed controlling-valve 29 will be kept open and there will be a steady pressure on the top of the piston 25 at the top of the spindle 24. In some cases the valve 23 may be a piston fitting into the seat 23ª, in which case the spindle 24 would be supported by the valve 26, resting on its seat. The area of the hole in the valve-seat 23ª is equal to twice the cross-sectional area of either of the holes in which fit the pistons 25 and 27, which are equal in area.

In the modification of the automatic regulator shown in Fig. 10 the cushioning of the valve 23 is assisted by a spring 24ª, placed above the valve. In this construction the valve 23 is formed hollow to provide an increased passage for the steam from the boiler to the receiver. In this case the area of the upper end 23ᵇ of the stem of valve 23 is equal to the area of the space 23ᶜ between the valve and its seating.

Figure 6:
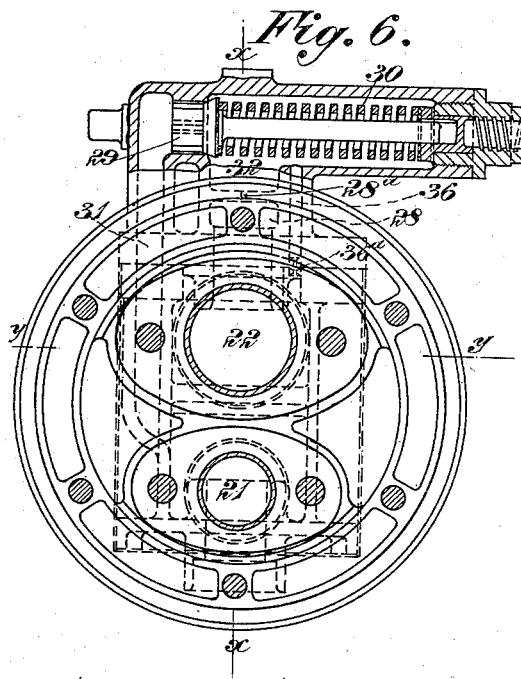
Figure 7:
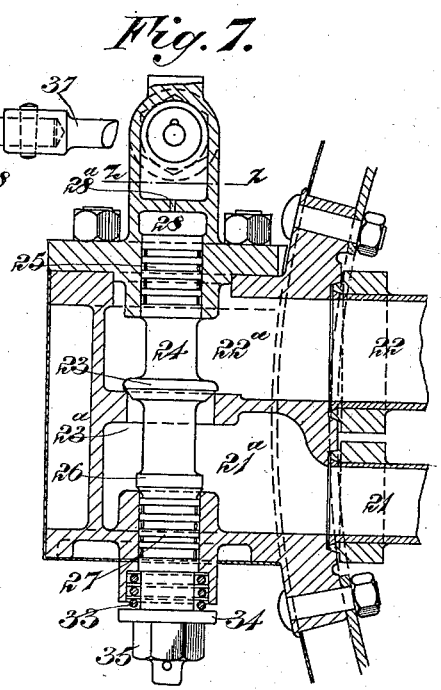
Figure 8:
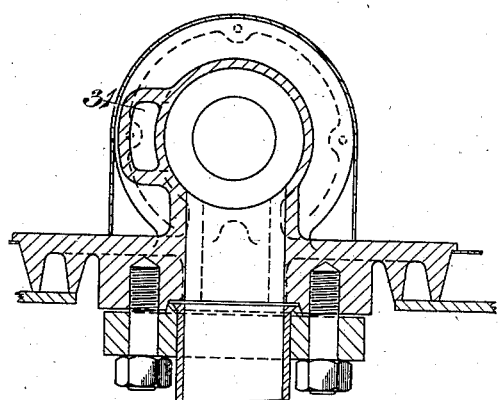
Figure 9:
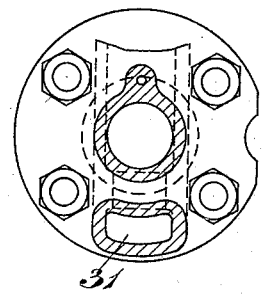

Should it be desired at any time to increase the pressure in the receiver, and consequently the pressure in the low-pressure cylinders, it is only necessary to compress the spring 30, Fig. 6, in the automatic regulator to obtain any desired pressure up to the pressure in the boiler; but in order to work the engine most advantageously I regulate the pressure admitted to the receiver so that the horse-power developed in each cylinder shall be about equal. To attain this end, the spring 30, which controls the pressure, is tested and indexed, and the indications for certain pressures which give certain results are shown on a suitable disk, such as shown in Figs. 11 and 12, within reach of the driver. The rod 37, Figs. 6 and 11, is connected to a screw-spindle 38, that passes through a stuffing-box (see Fig. 6) on the regulator-casing. This screw-spindle enables the valve 29 to be closed against any pressure when required. The arrangement is such that when the hand-wheel 39 is turned so that its pointer 39ª is opposite a certain pressure-indication on the disk the spring 30, Fig. 6, is compressed or relaxed, and a corresponding pressure of steam is admitted to the receiver. Suitable stops 40 and 40ª are provided on the hand-wheel and disk, respectively.

41 is a set-screw to fix the pointer at the pressure required in the receiver. The pressure of the steam in the receiver may also be indicated by a suitable pressure-gage. In some cases I provide a steam-cock capable of being operated by hand independently of the automatic regulator when it is desired to increase the pressure in the receiver.

The arrangement of non-return valves enables the engine to be started easily and safely from any position that the pistons and valves may occupy at starting, as described in the aforesaid specification of my former Letters Patent of the United States, No. 484,833, dated December 8, 1891. For example, should the distributing-valve of the high-pressure cylinder be open at starting to admit steam from the steam-chest to one end of the cylinder the non-return valve at the other end will open and admit steam at the pressure in the receiver. Hence the pressure acting upon the high-pressure piston at starting will be the pressure of steam in the steam-chest minus the pressure of steam in the receiver, or should both ports of the high-pressure cylinder be closed at starting the piston will be subjected on both sides to the reduced pressure from the receiver, the engine being thus enabled to make a start with one or other of the outside cylinders. Again, should the high-pressure distributing-valve close one port and open the other, so as to admit steam from the receiver therethrough, the non-return valve at the other end of the cylinder will admit steam at equal pressure. This latter position is illustrated by way of example in Fig. 2. The engine is then started as follows: Steam is admitted to the receiver 4 and passes therefrom through the steam-port 13ª and fills the space between the piston 1ª and the back end of the cylinder 1 and would force the piston to move to the left; but as the steam-port 13 is closed to the steam-chest and the space between the front end of the cylinder—i. e., the left hand end viewing Fig. 2—and the piston is empty of steam the steam in the receiver 4 acts on the bottom of the non-return valve 7 and lifts said valve, thereby admitting steam automatically from the receiver to the front end of the cylinder, thus placing the high-pressure piston in equilibrium, and consequently free to move in either direction. The engine is thus enabled to make a start with one or other of the outside cylinders.

As the pressure on the top of the non-return valves after the engine starts is always greater than the pressure on the bottom, (that from the receiver,) the non-return valves remain closed after the engine starts and during the time it is working.

The steam passes direct from the boiler through the pipe 21 into the automatic regulator and leaves the latter at a predetermined pressure through the pipe 22 direct to the low-pressure cylinders through the receiver 4. The high-pressure cylinder is formed for the attachment of the steam-pipe 45 thereto. The steam-pipes 21 and 45 are both fed from the main steam-pipe on the opening of the main steam-regulator, which regulator is placed in the dome on the boiler by preference. The steam from the pipe 45 passes direct into the high-pressure steam-chests, and the steam from the pipe 21 passes into the low-pressure steam-regulator and leaves it again at a previously-determined pressure through the pipe 22 direct to the low-pressure cylinders. Thus at about one and the same time steam at one pressure enters the high-pressure-cylinder steam-chests and steam at another pressure enters the low-pressure steam-chest, both ready to be admitted into the cylinders to produce work when admitted thereto by the action of the slide-valves. After the first exhaust from the high-pressure cylinder has passed into the receiver 4, and if the pressure of the same remains at or above the predetermined pressure that it is desired to work the low-pressure cylinders, the regulator automatically closes and ceases to draw a supply of steam from the boiler; but should the pressure in the receiver 4 drop below the predetermined pressure the regulator will open and maintain the desired pressure. Should the pressure of the steam from the boiler be wire-drawn through the main regulator down to a pressure less than the predetermined pressure of the steam allowed to pass the automatic steam-regulator that admits steam to the receiver, the valve 29 remains closed, the valve 23 will lift, and the steam-pressure in the chambers $21^a$ and $22^a$ will be about equal and the engine will work as a simple engine.

With low-pressure cylinders not much larger than the high-pressure cylinder, as herein shown, the latter when working the engine compound in the ordinary way develops a higher horse-power than either of the low-pressure cylinders, and by admitting extra steam to the receiver in order to increase the power of the lower-pressure cylinders the power of the high-pressure cylinder is decreased on account of the back pressure so produced. In this way the horse-power developed by the several cylinders can be made about equal, or the pressure in the receiver may be increased to any point up to the boiler-pressure, the outer cylinders doing the work, while the central piston is practically placed in equilibrium, the engine then acting as a simple engine. The state of working between ordinary compound and up to working as a simple engine may be termed "semicompound." By these means increased power can be obtained when starting a heavy train for pulling up inclines or when extra work is required, the engine being thus adapted for working with two powers, one as ordinary compound and the other semicompound, as described. The power of the engine can thus be increased to any degree within the maximum limit to suit the work to be done without in any way interfering with the balance of the engine, the turning effort and stress on the crank-and-valve motion being steady and uniform. By the arrangement of cylinders hereinbefore described the low-pressure pistons never become a drag on the high and the pressure in the receiver, and hence the back pressure on the high-pressure piston is maintained comparatively uniform, as one of the two low-pressure cylinders is always taking steam, and thereby preventing pressure from accumulating in the receiver. For the same reason the exhausts are frequent and a uniform draft is obtained.

What I claim is—

1. In a compound locomotive-engine, the combination of a high-pressure cylinder, two low-pressure cylinders arranged one at each side of said high-pressure cylinder, a receiver forming the exhaust-chamber of the high-pressure cylinder together with the steam-chests of the two low-pressure cylinders, said receiver being located between the low-pressure cylinders and extending around the sides and bottom of the high-pressure cylinder, cylindrical valve-seats located in said receiver and having ports communicating with passages leading to the respective ends of said cylinder, a pair of connected piston-valves arranged to work in said valve-seats and control said ports, additional passages forming communication between said receiver and the ends of the high-pressure cylinder, and non-return valves located in said passages adapted to close the latter during the normal compound working of the engine and each adapted to open the passage in which it is located when the pressure in the receiver exceeds the pressure in the corresponding end of the high-pressure cylinder, substantially as described.

2. In a compound locomotive-engine, the combination of three steam-cylinders, one high-pressure and two low-pressure, a receiver forming the exhaust-chamber of the high-pressure cylinder together with the steam-chests of the low-pressure cylinders, passages 9, $9^a$ respectively leading from the ends of the high-pressure cylinder, pipes 10, $10^a$ connected to said passages 9, $9^a$ and leading therefrom to accessible parts of the engine, passages 8, $8^a$ leading from the receiver to said accessible parts, and non-return valves 7, $7^a$ located at the junctions of said pipes 10, $10^a$ and passages 8, $8^a$ substantially as described.

3. In a compound locomotive-engine, the combination of a central high-pressure cylinder, two lower-pressure cylinders arranged outside the frames one at each side of said high-pressure cylinder, and a receiver forming the exhaust-chamber of the high-pressure cylinder together with the steam-chests of the two lower-pressure cylinders and located between the lower-pressure cylinders and extending around the sides and bottom of the high-pressure cylinder, the central high-pressure cylinder being supported at one end by the engine-framing and at the other end by transverse upper and lower girders and thereby held in position between the frames independently of the outside cylinders, substantially as described.

4. In a three-cylinder compound locomotive-engine, the combination with the engine-frame and transverse upper and lower girders connected thereto, of a central high-pressure cylinder, two outside low-pressure cylinders between which said high-pressure cylinder is arranged, and a receiver formed partly by the exhaust-chamber of the high-pressure cylinder and partly by the steam-chests of the low-pressure cylinders, said high-pressure cylinder having at its back end a transverse plate or flange 14 formed with flanges $14^a$ and $14^b$ attached to said engine-frame and at its front end upper and lower flanges 16 and 16ª attached to said upper and lower girders 17 and 17ª respectively and said high and low pressure cylinders having at their adjacent parts flanges 19 and 19ª on the sides of the one attached to corresponding flanges 20 and 20ª on the others, substantially as described.

5. In a compound locomotive-engine, the combination with the boiler and steam-receiver, of means for automatically admitting steam from said boiler to said receiver and for maintaining a predetermined pressure in the latter, said means comprising an admission-valve subjected on one side to the pressure of the boiler-steam, a cut-off valve subjected to the action of steam from the boiler at a regulated pressure, a loaded controlling-valve adapted to admit steam at such regulated pressure to said cut-off valve, means whereby the load on said controlling-valve can be varied to a predetermined extent at will, a piston on the end of the stem of the admission-valve and a cushioning-chamber in which said piston works, said chamber being formed with a small inlet and outlet orifice and adapted to contain cushioning liquid, substantially as described.

6. In a compound locomotive-engine, the combination with the boiler and steam-receiver, of means for automatically admitting steam from said boiler to said receiver and for maintaining a predetermined pressure in the latter, said means comprising an admission-valve subjected on one side to the pressure of the boiler-steam, a cut-off valve subject to the action of steam from the boiler at a regulated pressure, a loaded controlling-valve adapted to admit steam at such regulated pressure to said cut-off valve, means whereby the load on said controlling-valve can be varied to a predetermined extent at will and means whereby a constant steady pressure can be maintained upon the cut-off valve, substantially as described.

7. In a compound locomotive-engine, the combination with the boiler and steam-receiver, of means for automatically admitting steam from said boiler to said receiver and for maintaining a predetermined pressure in the latter, said means comprising an admission-valve subjected on one side to the pressure of the boiler-steam, a cut-off valve subject to the action of steam from the boiler at a regulated pressure, a loaded controlling-valve adapted to admit steam at such regulated pressure to said cut-off valve, means whereby the load on said controlling-valve can be varied to a predetermined extent at will, a valve upon the stem of the admission-valve adapted to prevent escape of steam into the outer air when it is closed, and a piston with packing-rings on said stem, substantially as described.

Signed at Newcastle-on-Tyne, England, this 19th day of December, 1898.

WALTER MACKERSIE SMITH.

Witnesses:
R. J. ROBSON,
J. WEATHERBURN.